(12) United States Patent
Wen et al.

(10) Patent No.: US 8,937,254 B2
(45) Date of Patent: Jan. 20, 2015

(54) APPARATUS AND METHOD FOR AN AIRCRAFT CONDUCTOR SANDWICH ASSEMBLY EMBEDDED TO AN AIRCRAFT STRUCTURE

(75) Inventors: Ed Wen, Bristow, VA (US); Adam Scott Ehrmantraut, Dumfries, VA (US); James McDaniel Snider, II, Reisterstown, MD (US); Robert Parks, San Jose, CA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 193 days.

(21) Appl. No.: 13/561,598
(22) Filed: Jul. 30, 2012
(65) Prior Publication Data
US 2013/0319727 A1    Dec. 5, 2013

Related U.S. Application Data

(60) Provisional application No. 61/652,550, filed on May 29, 2012.

(51) Int. Cl.
*H01B 7/00* (2006.01)
*H01B 7/08* (2006.01)
(52) U.S. Cl.
USPC ............... 174/113 R; 174/117 FF; 174/117 R
(58) Field of Classification Search
CPC ............................ H01B 7/0838; H01B 7/0823
USPC ................... 174/117 FF, 117 R, 72 A, 113 R
See application file for complete search history.

(56) References Cited

U.S. PATENT DOCUMENTS

| | | | | |
|---|---|---|---|---|
| 4,352,142 | A * | 9/1982 | Olson | 361/218 |
| 4,937,125 | A * | 6/1990 | Sanmartin et al. | 428/116 |
| 6,320,118 | B1 * | 11/2001 | Pridham et al. | 174/2 |
| 6,440,521 | B1 * | 8/2002 | Moore | 428/73 |
| 6,743,504 | B1 * | 6/2004 | Allen et al. | 428/362 |
| 2005/0062024 | A1 * | 3/2005 | Bessette et al. | 252/500 |
| 2007/0259135 | A1 * | 11/2007 | Hascalovich et al. | 428/19 |
| 2008/0277057 | A1 * | 11/2008 | Montgomery et al. | 156/307.1 |
| 2010/0170746 | A1 * | 7/2010 | Restuccia et al. | 181/290 |
| 2011/0272082 | A1 * | 11/2011 | Dunleavy et al. | 156/94 |
| 2013/0227952 | A1 * | 9/2013 | Grip et al. | 60/770 |

* cited by examiner

*Primary Examiner* — Timothy Thompson
*Assistant Examiner* — Sherman Ng
(74) *Attorney, Agent, or Firm* — Katten Muchin Rosenman LLP

(57) ABSTRACT

An aircraft conductor sandwich assembly configured to be embedded in a composite aircraft structure. The conductor sandwich assembly comprises a plurality of carbon conductors disposed between two sheets of insulating layers and an adhesive resin bonding the plurality of carbon conductors and the two sheets of insulating layers into a carbon sandwich assembly such that (i) the conductors are electrically isolated and (ii) structural loads can be passed through said conductor sandwich assembly.

27 Claims, 6 Drawing Sheets

Co-Bonded

APPARATUS AND METHOD FOR AN AIRCRAFT CONDUCTOR SANDWICH ASSEMBLY EMBEDDED TO AN AIRCRAFT STRUCTURE

CROSS-REFERENCE TO RELATED APPLICATIONS

This application claims the benefit of U.S. Provisional Patent Application No. 61/652,550, entitled "Apparatus And Method For An Aircraft Conductor Sandwich Assembly Embedded To An Aircraft Structure", filed May 29, 2012, the entire contents of which are expressly incorporated herein by reference.

TECHNICAL FIELD

The present invention relates generally to wiring and wire harnesses. More particularly, the invention relates to apparatus and method for an aircraft conductor sandwich assembly embedded to an aircraft structural member.

BACKGROUND INFORMATION

A wire harness (aka cable harness) is typically a collection of cables and/or wires which transmit informational signals ("signals") or operating currents ("power") from one point to another. These wires and/or cables are often bound together to form a harness using, for example, clamps, cable ties, cable lacing, sleeves, electrical tape, conduit, a weave of extruded string, or a combination thereof.

Wire harnesses are used in nearly every vehicle (e.g., automobiles, motorcycles, trains, ships, boats, spacecraft, and aircraft) and provide several advantages over loose wires and cables. For example, vehicles typically contain many masses of wires which may stretch over several miles if fully extended. Binding the wires and cables into harnesses better secures them against the adverse effects of vibrations, abrasions, and moisture. By constricting the wires into a non-flexing or semi-flexing bundle, usage of space is also increased, and the risk of a short circuit is greatly decreased. Similarly, installation time is decreased since an installer must install only a single harness (as opposed to multiple loose wires). In certain situations, the wires may be further bound into a flame-retardant sleeve that lowers the risk of electrical fires.

Although traditionally bound wire harnesses are highly advantageous over loose wires, there are still a few drawbacks. For example, in aviation, weight is a crucial factor and, as new military and civilian aircraft systems are developed, wire harnesses account for increasingly larger mass fractions of the aircraft's total weight. Similarly, for new military and civilian aircraft platforms, there is a continuous drive to simultaneously improve performance while reducing costs. Another drawback of traditionally bound wire harnesses is the clutter and space inevitably occupied by the wire bundles.

Furthermore, current aircraft development emphasizes electrical systems that enhance the overall performance of the platform. This includes state of the art systems such as fly by wire, electro-hydraulic actuators, distributed sensor systems and high power payloads. With the increased demand on electrical components have come increasingly complex installations and maintenance. Current efforts to reduce the weight and complexity of these systems center on moving from cables to high-speed serial architectures, switching from hydraulic to electrical systems, and distributed architectures. Not surprisingly, these efforts require an increased emphasis on harness materials and design while significantly reducing harness mass fraction, a task that cannot be accomplished with traditional wire harnesses.

Thus, what is needed is an economical, lightweight wire harness capable of being embedded within or integrated with the structure and/or body panel of a vehicle. Such a wire harness can be accomplished using CNT and/or CNF material. For example, one or more carbon conductors may be sandwiched between two insulating layers of material such that the conductor is electrically isolated and structural loads can be passed through the conductor sandwich assembly (CSA). The CSA may be incorporated either into or onto a composite structure without detrimental effect to the electrical and structural properties of the incorporated system.

SUMMARY

The present disclosure endeavors to provide an embedded wiring system and/or wire harness enabled for use in aviation and other vehicles. The present application aims to reduce or eliminate the above-described unnecessary costs, weight, and other problems by implementing a lightweight, streamlined, embedded signal technology as a replacement for (or in addition to) traditionally bound wire harnesses. This may be accomplished, for example, by sandwiching electrical conductors (e.g., CNT or CNF) between insulating layers to form a conductor sandwich assembly (CSA). The CSA may be embedded on the surface of a prefabricated structure or embedded within the structure itself (e.g., during the fabrication of a composite structure). One solution to the foregoing problems would be the embedment of wire harnesses within the structure of the vehicle. The present application teaches an embedded wiring system that, while greatly reducing unnecessary weight, may be applied to areas where wiring is prone to damage or where traditional wires cannot be easily run. For example, aircraft wheel wells and wing trailing edges are places where traditional wiring may be found hanging from structures and can be damaged by moving parts such as gas struts.

According to a first aspect of the present inventions, an aircraft conductor sandwich assembly configured to be embedded in a composite aircraft structure, includes: a plurality of carbon conductors disposed between two sheets of insulating layers; and an adhesive resin bonding the plurality of carbon conductors and the two sheets of insulating layers into a carbon sandwich assembly such that (i) the conductors are electrically isolated and (ii) structural loads can be passed through said conductor sandwich assembly.

According to a second aspect of the present inventions, an aircraft conductor sandwich assembly configured to be embedded to an aircraft structural member, includes: a plurality of carbon conductors bonded between two sheets of insulating layers; and an adhesive resin bonding the plurality of carbon conductors and the two sheets of insulating layers into a carbon sandwich assembly such that (i) the conductors are electrically isolated from each other and from any aircraft structural member, and (ii) structural loads can be passed through said conductor sandwich assembly.

According to a third aspect of the present inventions, a method for embedding an aircraft conductor sandwich assembly to an aircraft load-bearing structure, comprising the steps of: forming an aircraft conductor sandwich assembly including (i) a plurality of sheet-shaped carbon conductors bonded between two sheets of insulating layers, and (ii) an adhesive resin bonding the plurality of carbon conductors and the two sheets of insulating layers into a sheet-shaped carbon sandwich assembly such that the conductors are electrically isolated from each other and from any aircraft structural member, and such that structural loads can be passed through said conductor sandwich assembly; and then bonding the aircraft conductor sandwich assembly to the aircraft load-bearing structure.

In certain embodiments, the one or more carbon-based conductors may contain carbon nano-filaments and/or carbon nano-tubes. The one or more insulating layers may contain Poly Ether Ketone Ketone (PEKK) and/or polytetrafluoroethylene. The adhesive resin may be an aircraft film adhesive and/or the liquid epoxy used to fabricate the composite structure. The carbon sandwich assembly may further be co-cured or co-bonded with a composite structure.

For this application the following terms and definitions shall apply:

The term "carbon sandwich assembly" (CSA) as used herein describes the structure formed when one or more carbon conductors are sandwiched between insulating layers of material such that the conductor is electrically isolated and structural loads (i.e. shear, tension, compression, bending, and combined loads) can be passed therethrough. CSA may be enabled to carry power and/or signals through the one or more carbon conductors. The CSA may further include one or more shielding layers to reduce, or eliminate, interference to any signal carrying conductors or by any power carrying conductors. The CSA may be embedded deep within a structure (e.g., a composite structure) or embedded, or adhered, at the surface of a structure.

The term "composite structure" as used herein, includes any additive within matrix. For example, fiberglass, common carbon/epoxy materials, other resin material including plastic resin, polyester resin, polycarbonate resin, casting resin, polymer resin, thermoplastic, acrylic resin, chemical resin, and dry resin, advanced composite materials comprising application specific fibers embedded in an epoxy matrix, and composite hybrids made by the addition of some complementary material such as fiberglass or Kevlar to the basic carbon fiber/epoxy matrix.

BRIEF DESCRIPTION OF THE DRAWINGS

These and other advantages of the present invention will be readily understood with reference to the following specifications and attached drawings wherein.

DETAILED DESCRIPTION OF THE PREFERRED EMBODIMENTS

Figure 1A:
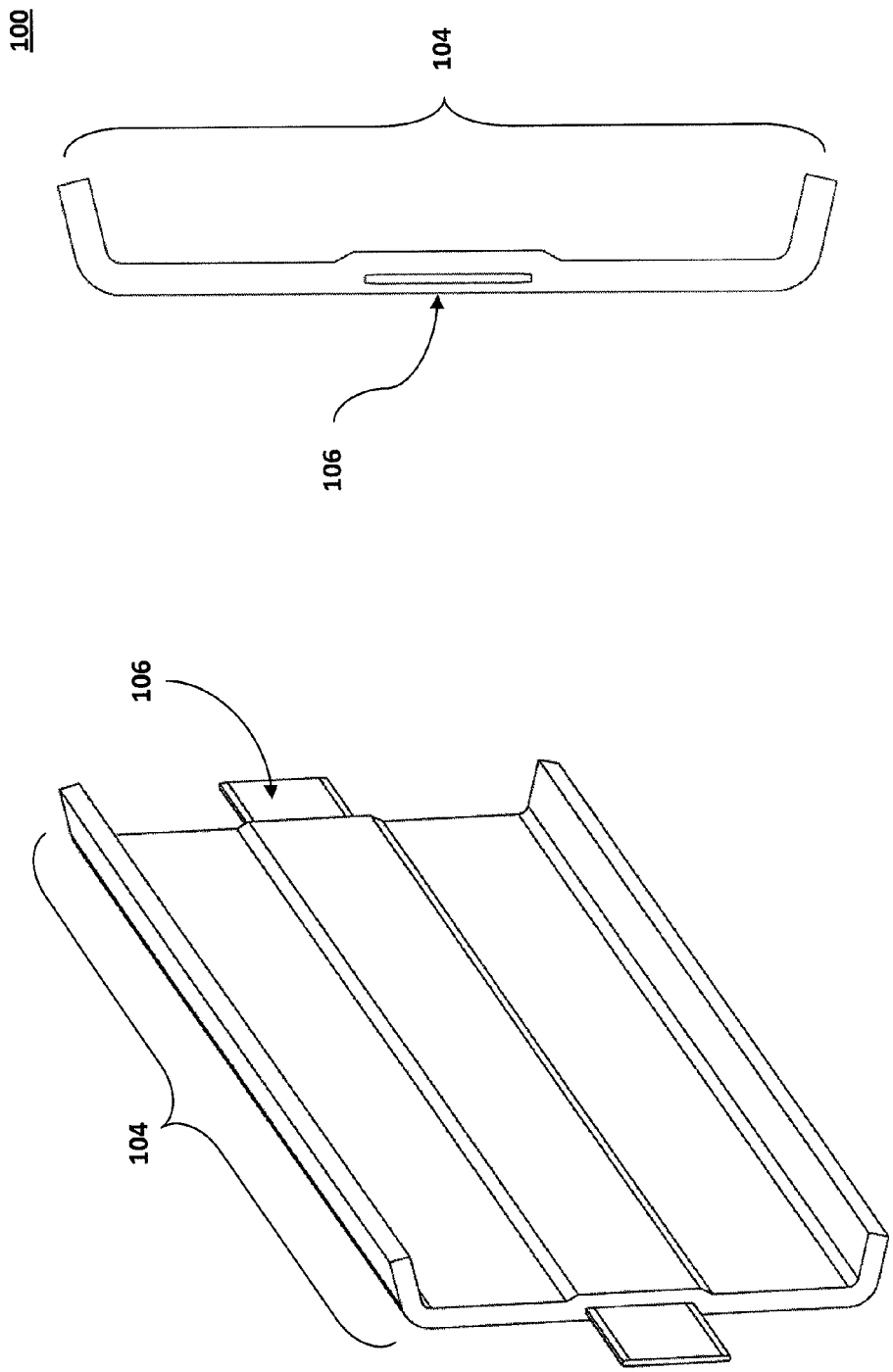
FIG. 1A illustrates an embedded carbon sandwich assembly co-cured within a representative structure.

Preferred embodiments of the present invention will be described hereinbelow with reference to the accompanying drawings. In the following description, certain well-known functions or constructions are not described in detail since they would obscure the invention in unnecessary detail.

A preferred embodiment of the present application teaches an economical, lightweight wire harness and wire harness system capable of being embedded within the structure and/or body panel of a vehicle. Using a carbon conductor material (e.g., CNT or CNF) as the conductor is preferred, however alternative conductors, such as metallic conductors and other non-metallic conductors, may be used. According to the preferred embodiment, one or more carbon conductor materials may be sandwiched between two or more insulating layers of material such that the one or more conductors are electrically isolated to form a conductor sandwich assembly (CSA). Structural loads may then be passed through the CSA where the CSA may further include one or more shielding layers to reduce, or eliminate, interference to any signal carrying conductors. The shielding layers may also act to reduce any interference created by power carrying conductors. A CSA (with or without shielding layers) may be incorporated either into or onto a composite structure without detrimental effect to the electrical and structural properties of the incorporated system.

Fortunately, over the last decade, carbon nanotubes (CNT, also known as buckytubes) have become an increasingly viable material for structural and electrical uses. Carbon nanotubes (not to be confused with carbon fiber) are allotropes of carbon with a cylindrical nanostructure and are an ideal conductor for an embedded signal application, as will be developed below. Another possible conductor may be carbon nanofibers/nanofilaments (CNF). CNFs (aka vapor grown carbon fibers (VGCFs) or vapor grown carbon nanofibers (VGCNFs)) are nanostructures with graphene layers arranged as stacked cones, cups, or plates, whereas CNTs are carbon nanofibers with graphene layers wrapped into cylinders.

The above-described problems and risks are greatly reduced by implementing embedded wiring technology (e.g., for power and signals) in lieu of traditionally bound wire harnesses. Additional benefits of embedded wiring technology include increased potential for the introduction of new health monitoring and distributed sensing capabilities that may be laid up (embedded during the manufacturing, co-cured or co-bonded) as part of the structure. Historically, health monitoring and distributed sensing capabilities were 1 inadequate due to the limitations and bulk of traditional wire harnesses. The embedded wiring technology would be pertinent to upcoming future technologies, such as Fly-By-Feel (FBF) and unmanned aerial vehicles (UAV). The use of embedded wiring technology allows for maturation as sensor technology evolves by eliminating the space constraint associated with traditional harnesses. This application envisages the matching of available embedded sensor technologies to a broad spectrum of applications in aircraft control, assessing mission performance, and cost benefits.

Current CNT materials, such as Nanocomp's conductive CNT yarn and sheet media, have a high strength, high conductivity, and low modulus compared to other traditional carbon materials. These features make them attractive for harnessing applications. It is also estimated that there will be a lifetime cost and weight reduction by using embedded CNTs with additional reductions as the material expectedly improves. In order to realize these reductions, development of conductor embedment that is structurally and electrically stable while being lightweight is essential. The embedding process itself is not CNT material specific, but instead may be adapted as CNT material matures and as other materials are developed.

Structural Advantages of Carbon Nanotubes and Carbon Nanofibers.

Generally speaking, copper is an inferior material to CNTs and CNFs for embedded wiring and harness application. First of all, copper has a higher coefficient of thermal expansion (CTE) than carbon (copper is ~16.6×10-6 m/m K while carbon is ~2×10-6 m/m K), which causes a change in volume in response to a change in temperature, lower strength, and a higher modulus which inhibits its flexibility. Secondly, copper is also prone to strain hardening which embrittles the material over time. These factors combine to make copper highly susceptible to breakage and damage as an embedded harness. However, CNFs and CNTs' CTE, low modulus, and high strength have the exact opposite effect, combining to handle large temperature swings and vibration, while deflecting with the structure. For these reasons, CNT and CNF materials are superior to copper for harness and wiring embedment. In addition, CNTs and CNFs can be folded and bent onto themselves without breakage, allowing them to be routed in the sharp corners and curves of composite structures. This property and their high strength enables CNF and CNT harnesses to have tight bend radii when exiting connectors.

Power System Embedment.

An embedded power harness (e.g., a CSA enabled for carrying power) may be made of one or more layers of non-impregnated CNT sheets sandwiched between two or more layers of insulating film (e.g., fiberglass, typically 5 mil) and a film adhesive (e.g., aircraft film adhesive) with moisture barrier (e.g., FM300-2 MB, a moisture barrier film adhesive). The moisture barrier material may be either the FM300-2 Moisture Barrier product available from Cytec or laid up using a layer of PEKK (e.g., around 0.0014 inch thick) and adhesive resin film. The fiberglass layers provide insulation and stability while the film adhesive provides a moisture barrier and bonds to the surrounding carbon composite. The fiberglass can also provide up to 2400V of breakdown resistance, an attribute that is critical for the embedded system because power systems can often carry high voltages, and any breakage or fracture in the insulating film could lead to a hazardous short circuit. In certain embodiments, the insulating film may comprise, or be comprised of, an etched, bondable polytetrafluoroethylene (PTFE) (e.g., Teflon, available from DuPont). PTFE material may be etched with a sodium ammonia or a sodium naphthalene etch so that its surface is chemically modified for adhesion to various substrates using ordinary commercial-grade epoxies. When etched for bonding, PTFE may be glued to surfaces to produce a non-stick, low-coefficient-of-friction unit.

As discussed in greater detail below, a CSA may be laid up (e.g., co-bonded or co-cured) with embedment material and, once cured, becomes part of the composite structure (e.g., a spar). During embedment, the CSA (or even individual CNT conductors) may be impregnated as part of the layup (e.g., impregnated during manufacturing of the composite structure, co-cured). Because the CSA is protected by the structure material, there is less opportunity for damage during operation and maintenance. In certain embodiments, depending on the threat of liquid for a particular application, one or more additional barriers may be added to protect against liquid intrusion. These barriers may be incorporated within the CSA or around the CSA during curing/embedment. In certain embodiments, the liquid epoxy used to fabricate the composite structure may also be used to bond the one or more carbon conductors and one or more layers to form the CSA. In certain embodiments, such as when co-cured, one or more CNT conductors may be placed directly in the composite material of the structure prior to curing such that they do not make unwanted contact with another conductor. This arrangement eliminates the need for insulating layers as the non-conductive composite material of the structure would isolate the CNT conductors and prevent unwanted contact with other conductors.

Signal System Embedment.

Signal harnesses (e.g., a CSA enabled for carrying signals) require higher levels of quality and complexity in comparison to electrical power systems. For example, to prevent inaccurate or weak signals, most conductive signal systems require strict voltage control but utilize very small currents, where it may be common to drive mega-ohm loads. For embedded signal conductors, individual CNT conductors (e.g., CNT yarn), shields, a fiberglass insulator and a moisture barrier may be used to form the CSA. With the assistance of an adhesive or resin, the CSA may then be applied as a laminate tape. This signal harness may also be laid up with the embedment material and ingresses/egresses similar to the power system embedment. Signal embedment benefits from the same protection as power system embedment while also gaining from the significant weight savings that CNTs offer for signal conductors and shields.

Ingress/Egress.

Ingress/egress of embedded harnesses requires particular care in order to protect both the CNT harness/CSA and the embedment material. Ingress/egress provides a stress and wear point for damage to the harness and presents a potential point for water, fuel, and foreign debris to enter the embedment material or composite structure. To counter this problem, two methods have been devised. For power systems, the conductor layup may exit the embedment material and lay on a nonconductive block. A threaded stud may be installed (e.g., wet-installed) into the conductor layup and acts as the mounting point for local harnessing. For signal harnesses, the conductor tape may exit the embedment material and be mounted to a printed circuit board (PCB). This is a similar process to mounting inter-board ribbon connections and may be, for example, soldered or compressed to the PCB. At this point, any number of connectors can be used to interface to the embedded signal harness. Because the harness is covered by the structure, there is less opportunity for damage during operation and maintenance.

Figure 1B:
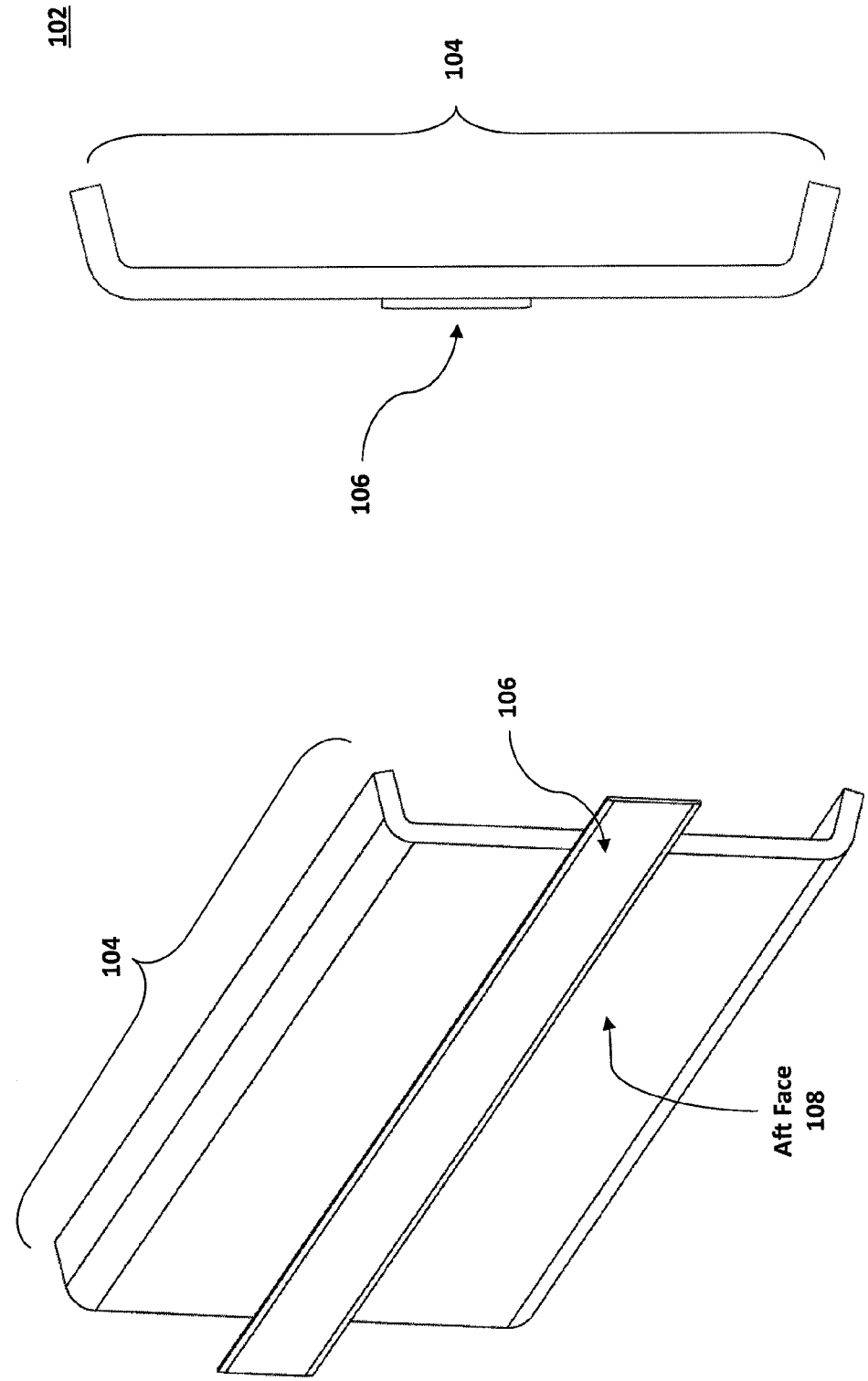
FIG. 1B illustrates an embedded carbon sandwich assembly co-bonded within a representative structure.

FIGS. 1A and 1B illustrate an embedded power and/or signal harness 106 (e.g., a carbon sandwich assembly (CSA)) enabled for use in an aircraft (e.g., a UAV) flight control device (e.g., a servo—device used to provide control of a desired operation through the use of feedback). A typical aircraft flight control system comprises multiple components, including, for example, flight control surfaces, the respective cockpit controls, connecting linkages, aircraft engine controls and the necessary operating mechanisms to control an aircraft's direction in flight. An embedded power and/or signal harness 106 can be used to electronically connect the various devices within a flight control system. In fact, an embedded harness 106 may be used in place of virtually any wire currently used in an aircraft that travels along a service which permits embedment or attachment.

The harness 106 may be embedded to the surface of a composite aircraft member, for example, embedded inside, or embedded on the surface of the composite aircraft member. In certain embodiments, the harness 106 may embedded on the surface of a metal structure, provided the harness 106 can be adhered to the metal and that insulation has been placed between the CNT conductors and/or any metallic structures such that they are electrically separated. As seen in FIGS. 1A and 1B, a power and/or signal harness 106, typically a CSA, may be embedded (e.g., surface embedment, or deep (subsurface) embedment within a structure) in the spar 104 (e.g., an aft spar) of, for example, an aircraft wing structure. In either surface embedment or deep embedment, the harness 106 may be either co-cured 100 (FIG. 1A, wherein the CSA is installed in the structure as the structure is built up and they are cured together) or co-bonded 102 (FIG. 1B, the CSA is bonded to a pre-fabricated structure, e.g., with a resin or other adhesive) with the composite structure. The harness 106 may be embedded along the neutral axis on the composite structure to minimize loads and reduce the effects of flexing. If the composite structure is rigid, or flexing is not a concern, the harness 106 may be installed at any point on the structure.

For embedment deep within composite structures (FIG. 1A), harness 106 may be impregnated and co-cured 100 within the composite structure to provide integrity with the surrounding structure and not act as a structural defect. The CSA should readily bond to the surrounding materials without creating voids or structural deficiencies. For embedment close to or at the surface of the structure (FIG. 1B), the harness 106 may not need to be impregnated within the composite structure but only within the layers of protective material surrounding conductors, which may be co-bonded 102 to the structure in a secondary operation (e.g., with a resin or adhesive). The ability to co-bond a harness 106 to a structure in a secondary operation may enable retro-fitting of existing vehicles and aircraft with embedded wiring technology. This would be particularly useful in instances where additional sensors may be desirable but were previously difficult to execute due to traditional wiring techniques. For example, a multi-conductor CSA may be manufactured as a combination of conductors, insulating film layers, and film adhesive and delivered in a form ready to be installed into a composite layup, and co-cured with said layup. Similarity, the multi-conductor CSA may also be enabled for installation on a traditional metallic structure, provided the multi-conductor CSA is insulated such that no electrical contact exists between the conductors and the metallic surface.

Although they are equally electrically conductive, co-cured 100 and co-bonded 102 configurations each have certain advantages. For example, co-cured 100 embedment is typically more durable because the harness 106 is deep within the composite structure material and thus the CNT is protected by the structure material; however, co-bonded 102 embedment is superior with respect to ingress/egress because the CNT harness is embedded at the surface and not deep within the structure, therefore providing easy access to surface connections without potentially weakening the composite structure's integrity. Similarly, co-bonded 102 embedment is more easily manufactured because the harness 106 may be simply applied to a surface of a structure in a secondary operation and does not require the simultaneous fabrication of the structure and the CNT harness 106. However, co-cured 100 embedment eliminates excess weight because it does not require additional protective/insulation layers or adhesives that are typically used to adhere and protect co-bonded 102 harnesses 106. In view of the above benefits attributed to each embedment type, a designer ought to weigh the factors and determine which would be more applicable to his or her particular project. For example, an aircraft developed for UAV use may require additional durability while eliminating weight and may therefore prefer co-cured 100 embedment. Regardless of the embedment type, the harness 106 may run along the length of the spar 104 until reaching, for example, the flight control servo location where the harness 106 would egress to provide the necessary power and signal input to the servo.

Figure 1C:
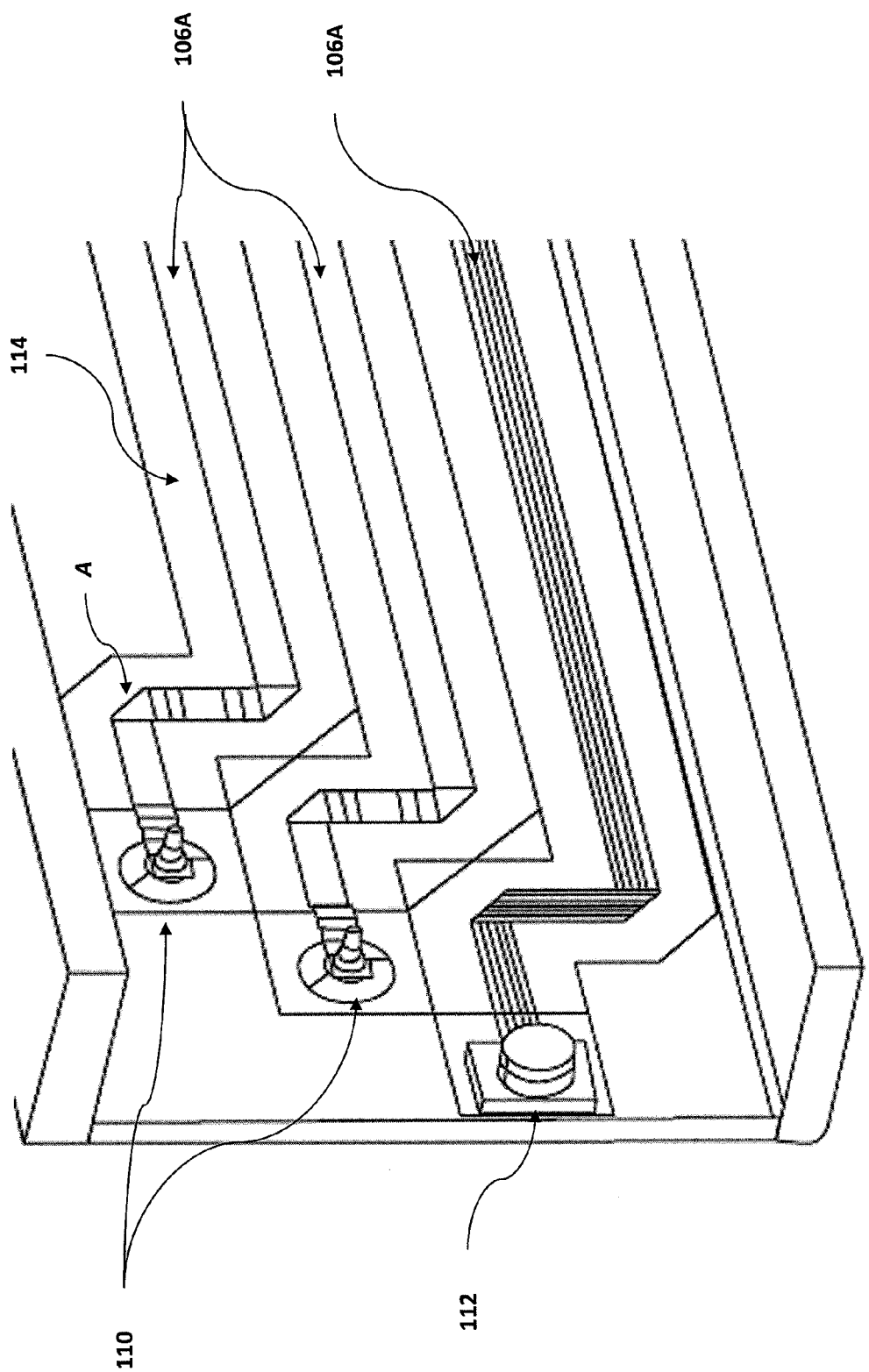
FIG. 1C illustrates an embedded power and signal harness (e.g., carbon sandwich assembly) co-bonded with a spar.

FIG. 1C illustrates an example embedment of a CSA having both power and signal conductors in a long endurance aircraft wing spar 104 using carbon nanotube conductors 106. As seen in the figure, power 106A and signal 106B CSAs are co-bonded 102 to the surface of spar 104 in the form of a laminate tape 114 (or beneath such a tape) and have ingress/egress connection points for both the power connections 110 and the signal connections 112. A number of connector types are possible, including, for example, 8P8C (eight positions, eight conductors) connectors, D-subminiature connectors, USB connectors, serial connectors, parallel connectors, power connectors, radio frequency connectors, DC connectors, RJ-XX connectors, etc. To prevent electrical failures and/or malfunctions, regardless of the connection type used, the connector should also be non-corrosive and not paired with another material that may lead to corrosion. For example, a problem discovered by a Kelly AFB engineer trained in corrosion control was the corrosion of tin-plated electrical connector pins when mated with gold-plated sockets used in the F-16 fighter. At point A, FIG. 1C depicts examples where CNT conductors have been folded and bent onto themselves without breakage, allowing them to be routed into the sharp corners and curves of both composite and non-composite structures. This feature of CNT conductors make them an ideal conductor for small spaces with sharp bends and turns.

Figure 2:
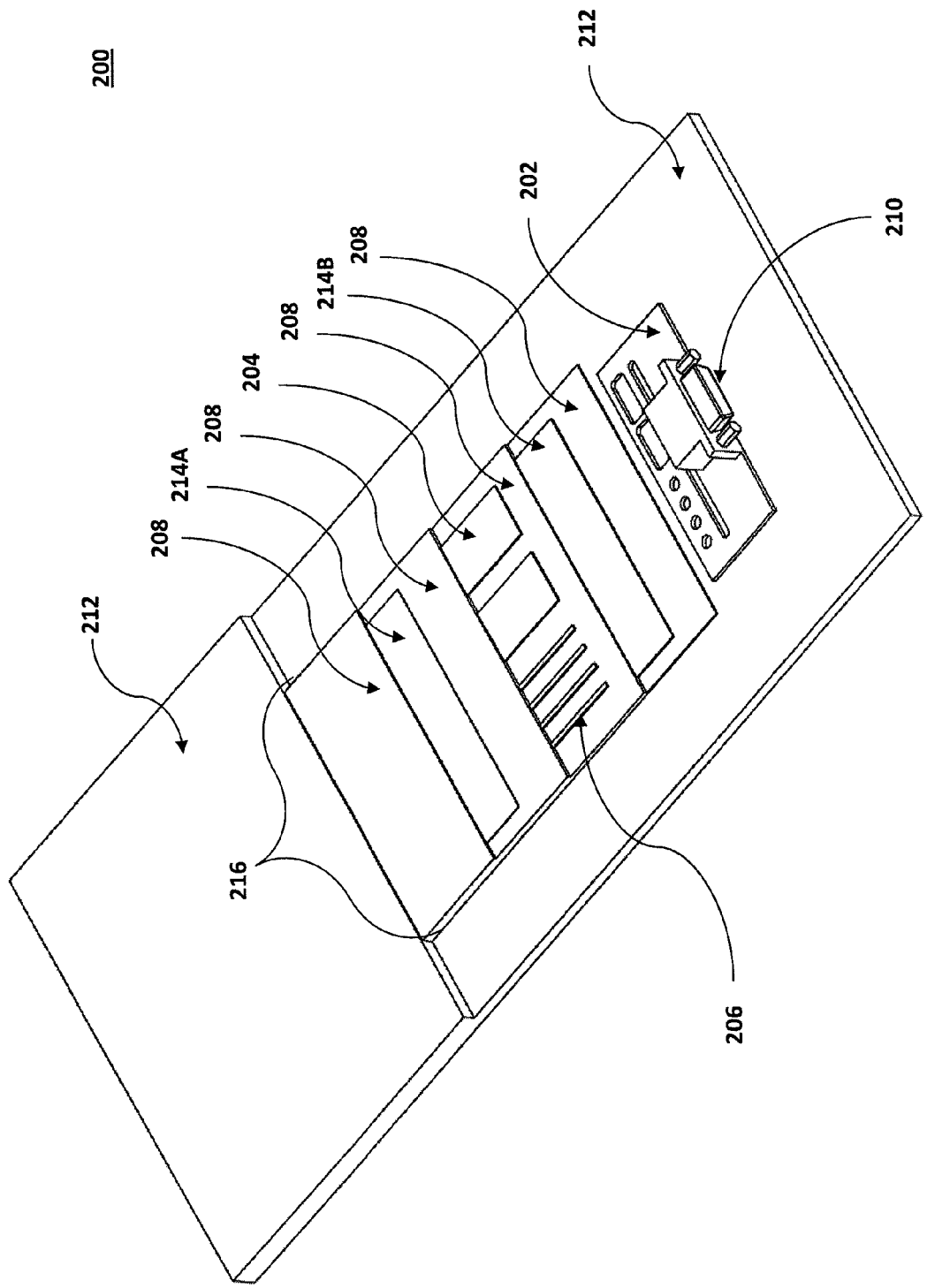
FIG. 2 illustrates an embedded carbon sandwich assembly with printed circuit board ingress/egress.

FIG. 2 illustrates a composite structure 212 with an embedded CSA 216 having both sheet-shaped power 204 and signal 206 conductors coupled with a printed circuit board (PCB) 202 ingress/egress. As seen in the figure, the CSA 216 may be fabricated from multiple layers of CNT sheet 204 and yarn 206 sandwiched between layers of a polymer insulator 208 (e.g., fiberglass prepreg, bondable polymer film, and/or moisture barrier film adhesive) to form a CSA enabled to carry both power and electrical signals. Fiberglass prepreg is readily available but, as a woven material, may allow a conductor fiber to penetrate through the weave to cause shorting or power loss. An alternative polymer insulator may further include moisture barrier film adhesive, such as a material originally intended to keep moisture from being absorbed into a honeycomb core. Moisture barrier film adhesive may be made from a thin layer of PEKK (Poly Ether Ketone Ketone), called an interleaf, and film adhesive and/or matrix resin on the sides of the PEKK. For example, a suitable off-the-shelf moisture barrier product is FM300-2 Moisture Barrier, available from Cytec. Alternatively, a moisture barrier may be hand laid up using 0.0014-inch thick PEKK and film adhesive. As seen in FIG. 2, shield layers 214A, 214B are installed within the CSA on each side of the CNT conductors to shield any noise (e.g., electromagnetic compatibility (EMC) and electromagnetic interference (EMI)). In signal applications, such interference must be reduced as it may lead to weak and/or inaccurate signals. The CSA (including any CNT sheet materials 204, 206) may be impregnated prior to the start of assembly (co-cured) or may be placed into the layup using the same process for fabricating a carbon epoxy layup (co-bonded).

In addition, a conductive epoxy may be used to prevent resin flow into the CNT during impregnation while also providing for an attachment method to a PCB. While this method allows for connection, the process may not be ideal for a manufacturing environment and adds weight which may be reduced using alternate methods. A solution would to electroplate the ends on the CNT sheet 204 and/or yarn 206 with a metal (e.g., tin, gold, copper, etc.). This electroplating process allows for a reduced system weight in comparison to conductive epoxy and reduces the overall stack-up height (e.g., thickness) of the PCB 202 connection. Electroplating the ends of the conductors with a metal also allows for easier connection to a second conductor outside the structure 212. The materials for attachment of the tinned CNTs to the PCB 202 or other connector 210 should be manufactured to military specifications and/or using military materials and processes. Furthermore, methods for plating of CNT's ends prevents resin flow into the area and allow for easy attachment to PCBs or other connectors using traditional materials.

To determine the mechanical capability of the embedded system of FIGS. 1 and 2, an article containing embedded CNT conductors (via a CSA) was tested by applying tensile and compressive strains similar to those expected during pull up of a large scale aircraft (e.g., UAV). The tests concluded that not only could the article withstand the strains when located near the neutral axis, but also could sustain the bending strains of the spar caps without increasing electrical resistance, a critical element to most electrical systems. This demonstration of strain capability indicates that the CNT embedment method of the present application has the potential to be used at any convenient location on the outer skins and spars of large scale UAVs. Testing shows the embedded system of FIGS. 1 and 2 is capable of +5000, −4000 micro-strains which is a typical strain range for aircraft skins and spars at ultimate load during maximum pull-up deflection.

Figure 3:
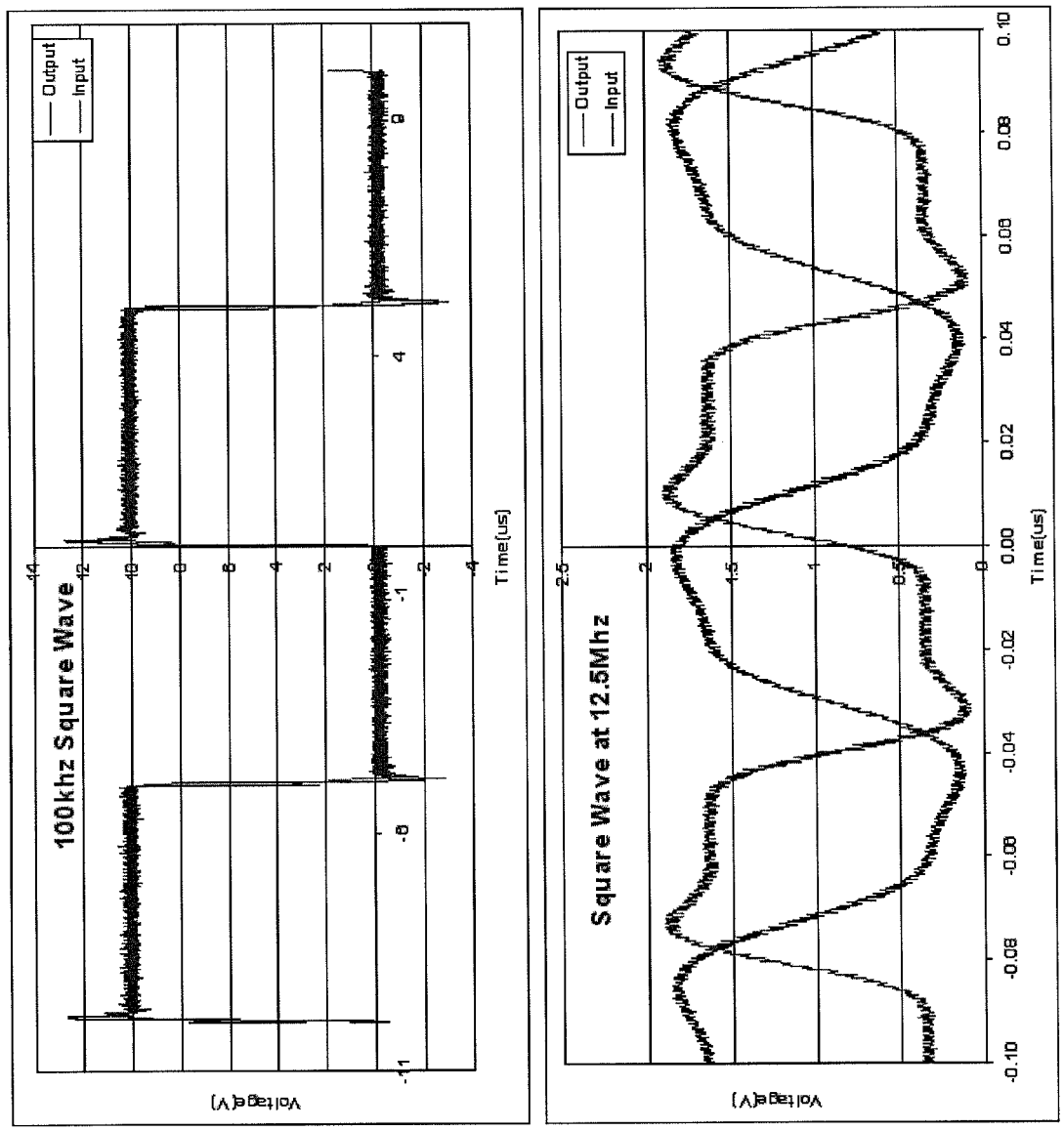
FIG. 3 depicts two graphs illustrating that embedded CNT signal performance is consistent with copper performance for both serial and 10 Mbit Ethernet Systems.

An article containing embedded CNT conductors was also tested to determine signal integrity and power capability. FIG. 3 is a graph illustrating how embedded CNT signal performance is consistent with traditional copper harnessing for serial and 10 Mbit Ethernet systems. The signal waveforms were generated for serial, MIL-STD-1553, and 10 Mbit Ethernet interfaces using a 25 MHz signal generator. Signal testing shows no appreciable deviation under loading. Consistent signal performance with copper harnesses was observed up to 25 MHz for square wave input. Power testing was accomplished with a current control DC power supply and temperature sensors on the test article. Non-linear changes in current and temperature which would indicate a breakdown in the conductor or failure of the conductive epoxy were not observed. Because of the high resistivity, the CNT conductors are ideal for signal and lower power applications. Essentially, the embedded CNTs have proven to be as electrically conductive and reliable as a copper equivalent, without the deficiencies inherent to copper metal described above. At 100 kHz, the square wave output signal was virtually identical to the input signal, such that, when overlapped, the signals matched. Similarly, at 12.5 MHz, the output wave form was practically unchanged from the input signal, just shifted in the time domain Based on the developed CNT embedding methods and their successful results, this novel system and architecture will be a critical enhancement to future vehicular electrical systems. For example, without embeddable harnessing, it is very difficult to reliably embed strain gauges, constant voltage anemometers, temperature sensors, and other health management systems directly into composite structures. With embeddable CNT harnessing, these sensors and networks can lead to new ways of maintaining up-to-date knowledge of airframe health, leading to enhanced preventive maintenance and system prognostics. In addition, decentralized control and aero-sensing systems can now be implemented as part of a "Fly-By-Feel" and UAV system that does not suffer from the CTE mismatch and material degradation of copper systems, leading to more reliable system performance.

Figure 4:
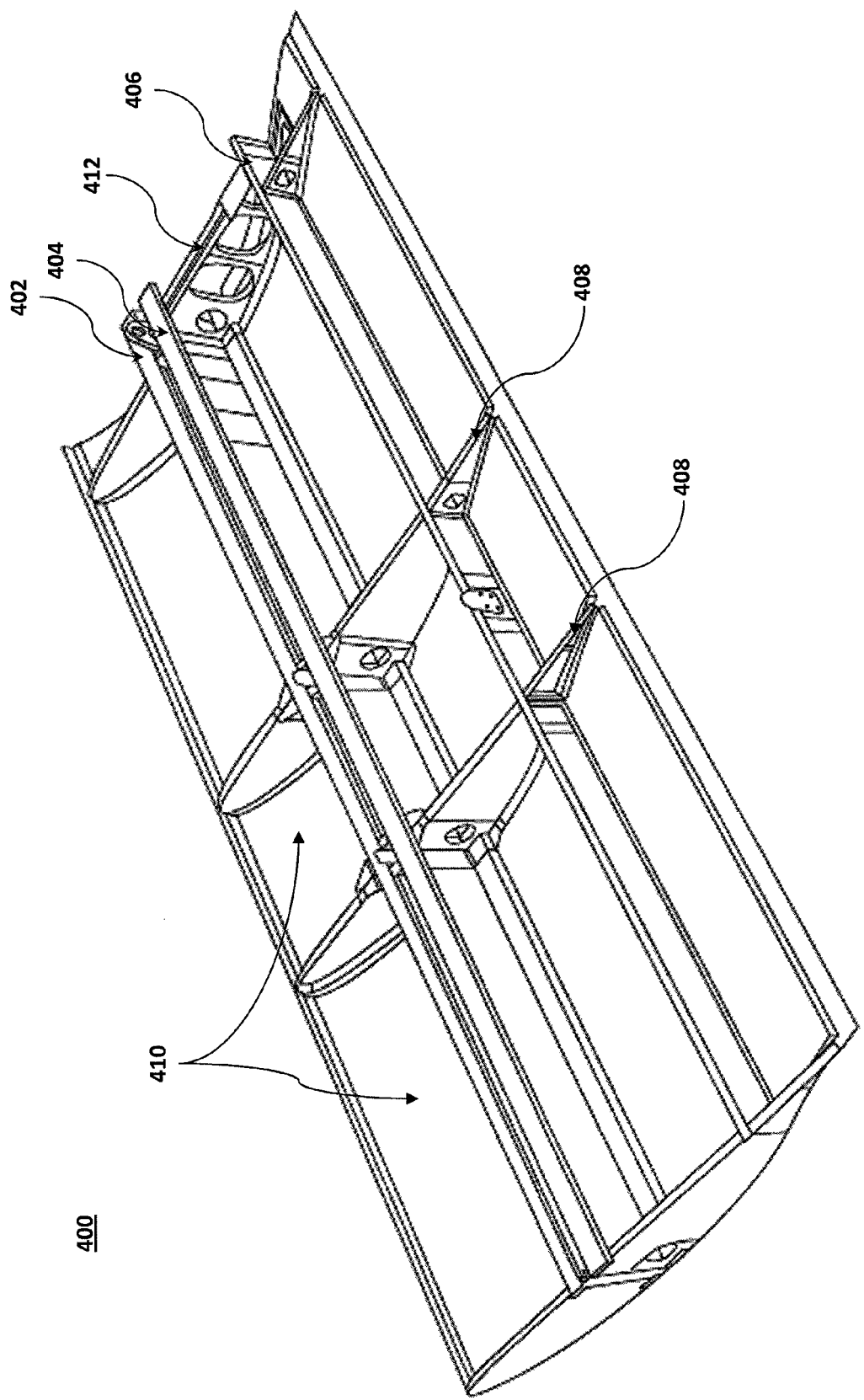
FIG. 4 depicts a section of a typical aircraft wing capable of embedded harness application.

FIG. 4 depicts a ten-foot section 400 of a typical aircraft wing (e.g., Aurora's Orion UAV). Several signal and/or power wire harnesses may be embedded in the wing area, such as engine harness controls, discretes ("kill", "safe"), accelerometers, strain sensors, and constant velocity anemometers. For example, one or more sensors may be embedded in the wing panel 410 while the CNT conductors may be installed along the leading edge 402 and main 404 spars. The versatility of embedded harnesses enables embedding in and around the various ribs 408, 412 and spars 402, 404, as well as other wing structures (e.g., body panels and skins). With embedded CNT technology, a number of sensors and their associated wiring may be installed on nearly any assessable surface of an aircraft.

As with typical harness design, embedded CNT harness design starts with a logical signal model and follows the definitions of a traditional electrical harnessing design rules. As with traditional harness design, the physical electrical CNT harness design is a cross-disciplinary activity involving both electrical and mechanical considerations. The task encompasses electrical definition of the wire gauge for proper sizing of power and signal lines using modeling of electrical characteristics cable capacitance effect, and shielding from noise EMC/EMI. Other considerations include resistance to environmental conditions and hazards, manufacturability, repair and maintainability, weight, and space saving. Generally speaking, based on existing CNT technology, the correlation between CNT and copper wire is based on weight. For example, at DC, CNT is generally twice as heavy as copper. However, at about 15 kHZ, CNT is more weight efficient than copper (not counting packaging). Moreover, volumetrically, the ratio of CNT to copper is approximately 50:1. Currently, due to size constraints, CNT is more useful as a signal carrier that a power carrier; however, may also be used to carry power provided there is space for the CNT The individual components shown in outline or designated by blocks in the attached drawings are all well-known in the electrical conductance and aviation arts, and their specific construction and operation are not critical to the operation or best mode for carrying out the invention. While the description so far has centered on use in aviation, it is clear to those of skill in the art that it can equally be applied to other vehicles and vehicular systems, including, for example, automobiles, motorcycles, trains, ships, boats, spacecraft, and aircraft.

While the present invention has been described with respect to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patent documents, all articles, brochures, and all other published documents discussed above are hereby incorporated by reference into the Detailed Description of the Preferred Embodiment.

What is claimed is:

1. An aircraft conductor sandwich assembly configured to be embedded in a composite aircraft structure without substantial detrimental effect on the electrical and structural properties of the aircraft, comprising:
   a plurality of substantially longitudinally-shaped, substantially parallel carbon conductors disposed between two sheets of insulating layers; and
   an adhesive resin bonding the plurality of carbon conductors and the two sheets of insulating layers into a carbon sandwich assembly such that (i) the plurality of conductors are electrically isolated from each other and the carbon sandwich assembly and (ii) structural loads can be passed through said conductor sandwich assembly.

2. The aircraft conductor sandwich assembly of claim 1, wherein each carbon conductor comprises carbon nano-filaments.

3. The aircraft conductor sandwich assembly of claim 1, wherein each carbon conductor comprises carbon nanotubes.

4. The aircraft conductor sandwich assembly of claim 1, wherein each sheet of insulating layer comprises Poly Ether Ketone Ketone (PEKK).

5. The aircraft conductor sandwich assembly of claim 1, wherein each sheet of insulating layer comprises etched, bondable polytetrafluoroethylene.

6. The aircraft conductor sandwich assembly of claim 1, wherein the adhesive resin comprises an aircraft film adhesive.

7. The aircraft conductor sandwich assembly of claim 1, wherein the adhesive resin comprises a liquid epoxy.

8. The aircraft conductor sandwich assembly of claim 1, wherein the ends of each carbon conductor are plated with a metal or conductive adhesive.

9. The aircraft conductor sandwich assembly of claim 1, wherein the carbon sandwich assembly is co-cured with the composite aircraft structure.

10. The aircraft conductor sandwich assembly of claim 1, wherein the carbon sandwich assembly is co-bonded with the composite aircraft structure.

11. The aircraft conductor sandwich assembly of claim 10, wherein the composite aircraft structure comprises a prefabricated composite structure.

12. An aircraft conductor sandwich assembly configured to (i) be embedded to an aircraft structural member and (ii) be operative without substantial negative impact on the electrical and structural properties of the aircraft, comprising:
   a plurality of substantially longitudinally-shaped, substantially parallel carbon conductors bonded between two sheets of insulating layers; and
   an adhesive resin bonding the plurality of carbon conductors and the two sheets of insulating layers into a carbon sandwich assembly such that (i) the conductors are electrically isolated from each other and from any aircraft structural member, and (ii) structural loads can be passed through said conductor sandwich assembly.

13. The aircraft conductor sandwich assembly of claim 12, wherein each carbon conductor comprises carbon nano-filaments.

14. The aircraft conductor sandwich assembly of claim 12, wherein each carbon conductor comprises carbon nanotubes.

15. The aircraft conductor sandwich assembly of claim 12, wherein each sheet of insulating layer comprises Poly Ether Ketone Ketone (PEKK).

16. The aircraft conductor sandwich assembly of claim 12, wherein each sheet of insulating layer comprises etched, bondable polytetrafluoroethylene.

17. The aircraft conductor sandwich assembly of claim 12, wherein the adhesive resin comprises an aircraft film adhesive.

18. The aircraft conductor sandwich assembly of claim 12, wherein the adhesive resin comprises a liquid epoxy.

19. An aircraft conductor sandwich assembly embedded to an aircraft structural member, comprising:
   a plurality of sheet-shaped carbon conductors bonded between two sheets of insulating layers, the plurality of conductors being disposed in parallel and extending longitudinally; and
   an adhesive resin bonding the plurality of carbon conductors and the two sheets of insulating layers into a sheet-shaped carbon sandwich assembly such that (i) the conductors are electrically isolated from each other and from any aircraft structural member, and (ii) structural loads can be passed through said conductor sandwich assembly.

20. The aircraft conductor sandwich assembly of claim 19, wherein the conductor sandwich assembly is embedded to the surface of the aircraft structural member.

21. The aircraft conductor sandwich assembly of claim 19, wherein the conductor sandwich assembly is embedded underneath the surface of the aircraft structural member.

22. The aircraft conductor sandwich assembly of claim 19, wherein the aircraft structural member comprises a composite material.

23. The aircraft conductor sandwich assembly of claim 22, wherein the aircraft structural member composite material is co-cured with the conductor sandwich assembly.

24. The aircraft conductor sandwich assembly of claim 19, wherein each of the of sheet-shaped carbon conductors is folded to make a change of direction.

25. A method for embedding an aircraft conductor sandwich assembly to an aircraft load-bearing structure, comprising the steps of:
   forming an aircraft conductor sandwich assembly including (i) a plurality of sheet-shaped carbon conductors bonded between two sheets of insulating layers, the plurality of conductors being disposed in parallel and extending longitudinally, and (ii) an adhesive resin bonding the plurality of carbon conductors and the two sheets of insulating layers into a sheet-shaped carbon sandwich assembly such that the conductors are electrically isolated from each other and from any aircraft structural member, and such that structural loads can be passed through said conductor sandwich assembly; and
   bonding the aircraft conductor sandwich assembly to the aircraft load-bearing structure.

26. The method of claim 25, wherein the bonding step includes the step of co-curing the aircraft conductor sandwich assembly with an aircraft composite load-bearing structure.

27. The method of claim 25, wherein the bonding step includes the step of co-bonding the aircraft conductor sandwich assembly with an aircraft composite load-bearing structure.

* * * * *